United States Patent [19]

Kovitch et al.

[11] Patent Number: 4,881,759

[45] Date of Patent: Nov. 21, 1989

[54] ALL WELDED SOUND ISOLATION FLEXIBLE CONNECTION

[75] Inventors: Frank J. Kovitch; Charles M. Reinhardt, both of Arlington; Paul E. Sullivan, Bedford, all of Tex.

[73] Assignee: Lockheed Corporation, Calabasas, Calif.

[21] Appl. No.: 140,471

[22] Filed: Jan. 4, 1988

[51] Int. Cl.[4] .............................................. F16L 55/02
[52] U.S. Cl. ..................................... 285/49; 285/234; 285/286; 285/223
[58] Field of Search ................. 285/234, 231, 223, 49, 285/286, 414, 405, 122, 190

[56] References Cited

U.S. PATENT DOCUMENTS

| | | | |
|---|---|---|---|
| 3,734,546 | 5/1973 | Herbert et al. | 285/234 X |
| 3,752,509 | 8/1973 | Stafford | 285/414 X |
| 3,862,771 | 1/1975 | Schwarz | 285/231 X |
| 4,068,864 | 1/1978 | Herbert et al. | 285/234 X |
| 4,491,348 | 1/1985 | Thelen | 285/234 X |
| 4,570,979 | 2/1986 | Moore | 285/49 X |

*Primary Examiner*—Randolph A. Reese
*Assistant Examiner*—Anthony Knight

*Attorney, Agent, or Firm*—Richards, Harris, Medlock & Andrews

[57] ABSTRACT

A flexible pipe joint having an annular housing with a central cavity in which a nipple is partially submerged. The nipple has a flared end on the submerged portion thereof. An elastomeric ring, internally contoured spherically with reference to a common center point spaced from the flared end and located on the longitudinal axis of the joint, is adhered about its outer surface to the inner surface of the flared end. An elastomeric body having an assembly of embedded concentric spherical rings is adhered to the outer surface of the flared end. The spherical rings are contoured and positioned symmetrically with respect to the common center point. A flange (42 or 144, 146) is welded to the nipple at the end opposite the flared end. The flange is used to bolt the joint to the adjacent pipe sections and can be in two parts (144, 146). A collar welded to the housing encircles the nipple and engages the outer surface of the elastomeric body to maintain the body in position. A support structure secured to the housing has an outward facing spherical surface mating in a sliding relation with the internal surface of the elastomeric ring.

7 Claims, 2 Drawing Sheets

U.S. Patent  Nov. 21, 1989  Sheet 1 of 2  4,881,759
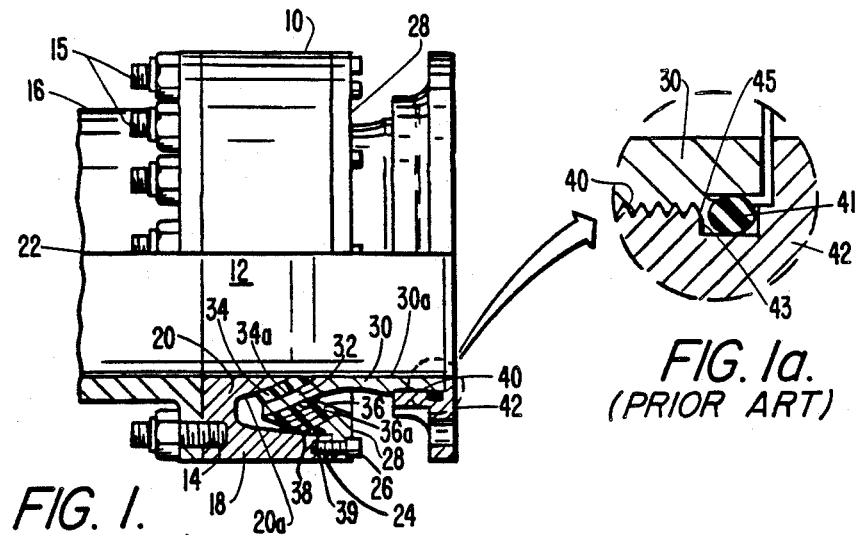
FIG. 1. (PRIOR ART)
FIG. 1a. (PRIOR ART)
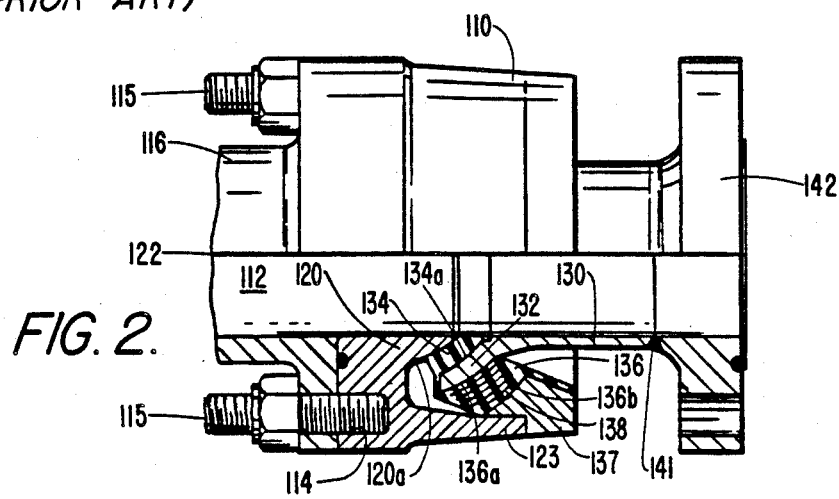
FIG. 2.
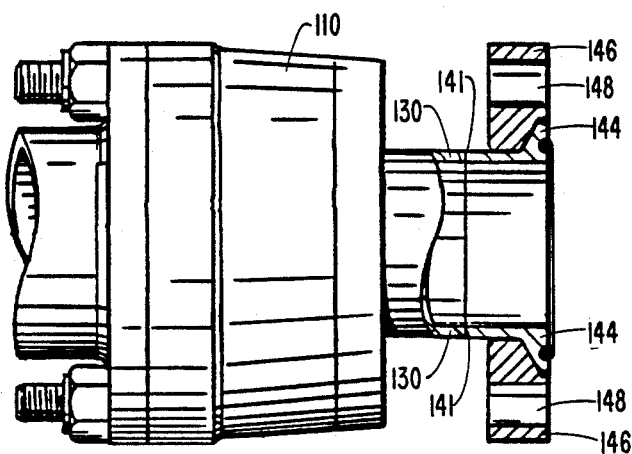
FIG. 3.

ALL WELDED SOUND ISOLATION FLEXIBLE CONNECTION

BACKGROUND OF THE INVENTION

1. Field of the Invention

This invention relates to a sound isolation flexible pipe connection for use in interconnecting sections of pipelines and attenuating the transmission of sound and other vibrations through the pipeline.

2. Description of the Present Art

Flexible joints capable of interconnecting sections of pipeline in a manner whereby both fluid-borne and structure-borne vibrations within the pipeline are absorbed or dampened by the flexible joint are commonly used in situations in which it is desirable to minimize the sound generated by fluid flow, conduit expansion, or machinery-induced pipeline vibrations. Such joints are of particular value when used in submarines where it is necessary to reduce sound and vibration levels in order to prevent detection by the enemy. It is also desirable to use a flexible joint in order to accommodate for minor misalignments between the sections of pipeline which are being interconnected.

Flexible pipe joints have been previously shown in U.S. Pat. Nos. 3,734,546; 4,068,864; and 4,491,348. Such pipe joints are normally constructed of inner and outer annular collars. An elastomeric body disposed between the collars provides the desired vibration attenuating characteristics. The two collar sections are thredably secured to one another by a plurality of bolts. An O-ring seal is commonly provided at the juncture of the collars in order to give the joint the necessary fluid-tight characteristics. The end flange is likewise secured to the inner piping through use of a large diameter threaded joint. This joint is always sealed with an O-ring seal.

In use, flexible joints are exposed to cyclic flexing caused by the motions of soft mounted pumps, conduit expansion, and normal fluid flow. As a result, the threaded connections between the collars are subject to loosening, and ultimately leakage. Furthermore, the O-rings are affected by age and the fluid in contact with them, which hastens their failure while in service. In addition, the threaded connections may rattle, thus increasing the transmission of sound through the pipeline and reducing the efficacy of the flexible joint. The mechanical connections in these joints all require sufficient material to receive and secure the threaded fastener holding the joints together. In a space limited and weight sensitive application, such as a submarine, these requirements of size, weight, and reduced reliability are detrimental.

SUMMARY OF THE INVENTION

In accordance with the present invention, a flexible joint is provided for pipelines. The flexible joint comprises an annular housing provided with a central cavity and a nipple partially submerged therein, the nipple having a flared end on its submerged portion. A first elastomeric ring is adhered to the inner surface of the flared end and is internally contoured spherically with reference to a common center point located on the longitudinal axis of the joint. A structure, preferably a portion of the housing, has an outward facing spherical surface mating in sliding relation with the internal surface of the elastomeric ring. An elastomeric body having an assembly of concentric spherical rings embedded therein is adhered to the outer surface of the flared end. A collar encircles the nipple and the elastomeric body and is adhered to the external surface of the elastomeric body. The collar is weldably joined with the housing to create a unitary, fluid-tight, vibration-attenuating, flexible pipe joint.

In accordance with another aspect of the present invention, the nipple has a flange weldably joined thereto for attaching the nipple to a mating pipe. By welding the collar to the housing, and the flange to the nipple, all O-rings are eliminated from the flexible joint, as have all mechanical interfaces which could create noise when subjected to vibration, expansion, and fluid flow operation.

BRIEF DESCRIPTION OF THE DRAWINGS

The novel features believed characteristic of the invention are set forth in the appended claims. The invention itself, along with the further objectives and advantages thereof, is best understood by reference to the following detailed description of an illustrative embodiment taken in conjunction with the accompanying drawings, in which:

FIG. 1 is a partial sectional view of a prior art flexible joint without the modifications of the present invention;

FIG. 1a is a detail view of a portion of the prior art flexible joint;

FIG. 2 is an elevational view partially sectioned to show the construction of a first preferred embodiment of the present invention;

FIG. 3 is an elevational view of the flange section of the present invention in a second preferred embodiment;

DETAIL DESCRIPTION OF THE PREFERRED EMBODIMENTS

Figure 4:
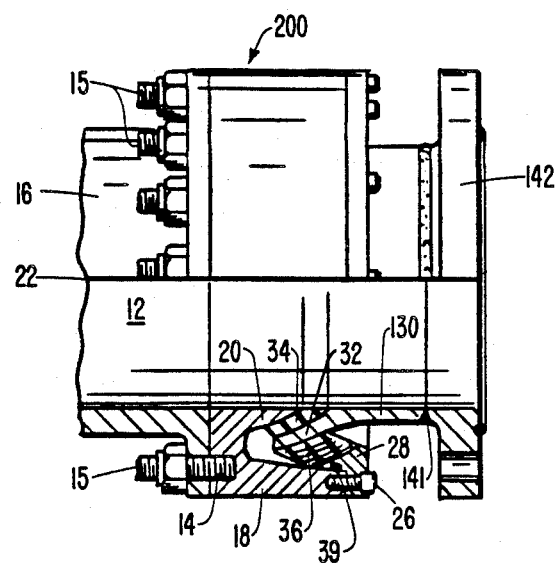
FIG. 4 is an elevational view partially sectioned to show the construction of a third preferred embodiment.

A conventional vibration attenuating flexible joint of the type disclosed in the prior art is illustrated in FIG. 1. Such couplings include an annular housing 10 having a central aperture wall 12 extending therethrough. A ring of threaded apertures 14 is provided on one side of housing 10 to receive studs 15 to provide means for bolting housing 10 to adjoining pipe section 16. The internal diameter of wall 12 is substantially identical to the internal diameter of pipe section 16, thus creating a uniform and continuous aperture through pipe 16 and housing 10.

Housing 10 has an outer cylindrical extension 18 and includes an inner annular lip 20. Lip 20 has an outer surface 20a which is spherically shaped relative to a point on the longitudinal axis 22 of housing 10. Extension 18 also includes a ring of threaded apertures 24 positioned at the opposite end of housing 10 from threaded ports 14 and arranged to receive a set of threaded bolts 26 which serve to attach a collar 28 thereto.

A nipple 30 having a flared end 32 and an internal bore defined by wall 30a is disposed between lip 20 and the outer portion of housing 10. An elastomeric ring 34 is bonded at surface 34a to the inner spherical surface of flared end 32. Elastomeric ring 34 contacts lip 20 in a sliding relationship. A plurality of channels (not shown) are formed in the surface of elastomeric ring 34 to equalize the pressure across ring 34. An elastomeric body 36 is adhered to the outer surface of flared end 32. Elastomeric body 36 contains a set of spherical rings 38 which are embedded therein and are positioned concentrically about longitudinal axis 22. Elastomeric body 36 is adhered at its outer edge to the inner spherical surface of collar 28.

In use, housing 10 is threadably mounted on pipe section 16 using studs 15 received in threaded ports 14. An O-ring 39 is positioned about the open end of housing 10 opposite pipe section 16. Nipple 30 is positioned such that flared end 32 is submerged within housing 10 and such that threaded apertures 24 are aligned to permit joinder of housing 10 and nipple 30 by means of threaded bolts 26 passing through collar 28 into housing 10. In this position, elastomeric ring 34 contacts outer surface 20a of lip 20 in a sliding relationship, elastomeric body 36 contacts the interior surface of outer cylindrical extension 18, and O-ring 39 provides a fluid-tight seal between housing 10 and ring 28.

Nipple 30 includes a threaded section 40 constructed to be threadably mounted to a flange 42. A second O-ring is placed at the juncture of nipple 30 and flange 42 to provide a fluid-tight seal therebetween. The O-ring 41 sits within an annular O-ring groove 43 formed in flange 42 and seals between the bottom and sides of groove 43 and a cylindrical seal surface 45 formed on the exterior surface of nipple 30. The threaded connection between nipple 30 and flange 42 and the ability of O-ring 41 to seal to nipple 30 at any position along surface 45 allows some rotational motion between flange 43 and nipple 30 to fit the joint 10 between pipe section 16 and the pipe section (not shown) secured to flange 42. In practice, joint 10 is usually installed with the bolt holes in flange 42 aligned with studs 15, with nipple 30 precisely aligned with housing 10 such that threaded bolt 26 can be used to secure them in place with respect to one another.

Flexible joints such as the one depicted in FIG. 1 have provided a significant level of vibration and sound wave attenuation in pipelines. However, certain structural characteristics of such joints have limited their performance characteristics. The mechanical connection between the nipple and the housing is the weakest section of the entire joint. As pressure in the joint increases, the flange 28 deflects in a rolling motion, separating from housing 10 at the position of O-ring 39, compromising the integrity of the seal formed by O-ring 39 and permitting fluid to leak past the seal 39.

Another problem encountered in the use of such flexible joints is encountered at the juncture between flange 42 and nipple 30. The threaded connection between nipple 30 and flange 42 requires the use of an O-ring 41 between nipple 30 and flange 42. If the workman or sailor installing the joint forgets to put O-ring 41 in place, the joint will leak. Also, the joint 10 is typically installed by threading flange 42 fully onto nipple 30 and backing flange 42 off a distance up to the separation between adjacent bolt holes on flange 42, creating a slight annular crevice between nipple 30 and flange 42 exposed to the fluid flow, giving rise to an opportunity for corrosion.

Mechanical connections, such as threaded bolts 26, tend to transmit vibrations despite the presence of the elastomeric ring and the elastomeric body. Mechanical connections also require the use of a relatively large housing 10, making the resulting flexible joint heavy. Not only are vibrations more readily transmitted by a heavier flexible joint, but also, the materials costs are increased as the size and weight of housing 10 are increased.

The problems inherent in the flexible joint shown in FIG. 1 are obviated by the improved flexible joint of the present invention, as embodied in FIGS. 2-5. The flexible joints of FIGS. 2-5 are constructed to replace existing joints without requiring additional adaptive parts and with a minimal amount of effort.

The flexible joint of FIG. 2 utilizes an annular housing 110 having a central aperture wall 112 extending therethrough and a ring of threaded apertures 114 on one side thereof. Threaded apertures 114 are arranged to permit housing 110 to be affixed to adjoining pipe section 116. The internal diameter of aperture wall 112 is substantially identical to the internal diameter of pipe section 116, providing a continuous aperture through pipe 116 and housing 110.

Housing 110 includes an inner annular lip 120. Outer surface 120a of lip 120 is spherically shaped relative to a point on the longitudinal axis 122 of housing 110. Housing 110 also includes an outer annular lip 123 having an outer diameter which is substantially less than the outer diameter of existing flexible joints, thus reducing both the materials cost and the vibration transmitting capacity of the flexible joint.

A nipple 130, having a flared end 132, is disposed such that flared end 132 is between outer annular lip 123 and lip 120. An elastomeric ring 134, having a plurality of channels (not shown) formed in its surface, is bonded along its outer surface 134a to the inner spherical surface of flared end 132. Elastomeric ring 134 is constructed to slidably engage lip 120. The channels in the surface of ring 134 provide for equalization of pressure across the body of ring 134 when it is in use. An elastomeric body 136 is bonded along its inner surface 136a to the outer surface of flared end 132. A set of spherical rings 138 are embedded within body 136 and positioned concentrically about longitudinal axis 122. A collar 137, having substantially less mass than collar 28, is bonded to elastomeric body 136 about its outer surface 136b, as shown in FIG. 2. Collar 137 is weldably mounted to outer lip 123 to create a unitary, fluid-tight flexible joint. The resulting flexible joint does not require the use of mechanical connections and thus does not share the vibration producing and transmitting problems of prior flexible joints. The welded flexible joint is unitary and thus will not leak at the juncture between collar 137 and outer lip 123 upon exposure to pressure and cyclical flexing in use, eliminating the need for O-ring 39. Because the welded connection eliminates the need for bulky metal sections to receive bolts 26, the diameter and weight of housing 110 and collar 137 are reduced relative to housing 10 and collar 28, resulting in better vibration-transmitting characteristics and reducing the size of the coupling as well as the material cost.

The welded connection between outer lip 123 and collar 137 is preferably achieved through the use of an electron beam welding technique. This welding technique is desirable because it creates the requisite bond between all communicating surfaces of lip 123 and collar 137. In addition, electron beam welding is localized and thus will not affect the elastomeric ring and the elastomeric body which are bonded to nipple 130 prior to welding.

By weldably connecting outer lip 123 to collar 137, a unitary flexible pipe joint is created in contrast to the multi-sectional prior art devices. Unitary construction of a flexible joint of the type disclosed by the present invention eliminates the potential for internal damage to the joint as a result of mishandling. At the same time, unitary construction minimizes the requisite maintenance of the joint and increases its reliability.

In a first preferred embodiment, shown in FIG. 2, nipple 130 is capable of being weldably mounted at juncture 141 to flange section 142. Again, for the reasons stated above, an electron beam welding technique is preferred in connecting nipple 130 to flange section 142. By welding nipple 130 to flange section 142 rather than using a conventional mechanical connection, the need for an O-ring 41 to prevent leakage is obviated. This is desirable because O-rings tend to leak over extended periods of use, as discussed above. As a result of the welding, the disclosed flexible joint is also significantly less susceptible to crevice corrosion between nipple 130 and flange section 142, further adding to its beneficial qualities. It should be appreciated that the all-welded flexible joint of the present invention is dimensioned and constructed to be interchangeable with existing flexible connections. Also, due to the use of welded connections rather than bolted and threaded connections, the all-welded flexible joint can utilize conventional as well as exotic metals.

A second preferred embodiment is shown in FIG. 3. In this embodiment, nipple 130 is weldably mounted to a first flange piece 144. A second flange piece 146 includes a ring of threaded apertures 148. In use, second flange piece 146 is affixed to a second pipe section (not shown) by means of bolts passing through apertures 148 and through corresponding apertures mounted on the second pipe section. Housing 110 is connected to pipe section 116 by means of a bolted connection through threaded ports 114 and corresponding ports on pipe section 116. Due to the two-piece nature of the flange in the second preferred embodiment, housing 110 and first flange piece 144 may be weldably connected without concern as to the alignment of the first and second pipe sections and the relative positions of the threaded apertures mounted thereon. Second flange piece 146 is then secured to the second pipe section through the use of bolts inserted through apertures 148. As depicted in FIG. 3, there is essentially a slip fit between first flange piece 144 and second flange piece 146. As a result of this slip fit, misalignment is easily overcome and the flexible joint of the present invention is less likely to fail over a period of use due to the cyclical application of shear forces. If desired, the particular slip fit can be fixed by welding sections 144 and 146 together.

The remainder of the flexible joint according to the second preferred embodiment is as depicted in FIG. 2 and described above with respect to the first preferred embodiment.

A third preferred embodiment is shown in FIG. 4. In this embodiment, flexible joint 200 incorporates the nipple 130 and flange section 142 welded at 141 identical to the first embodiment of FIG. 2. The remaining design of joint 200 corresponds to joint 10.

Figure 5:
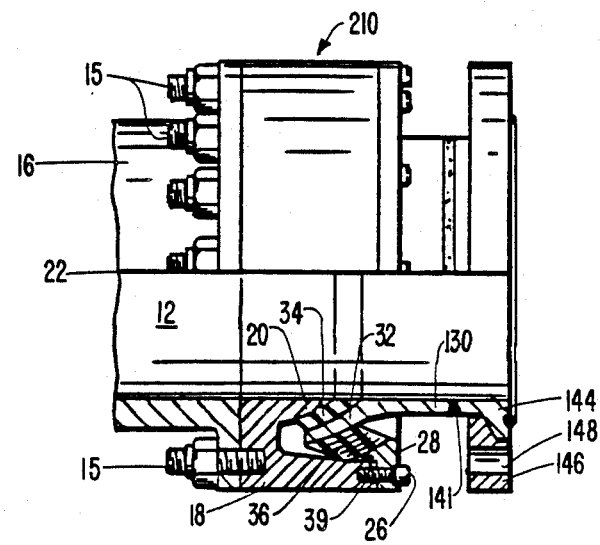
FIG. 5 is an elevational view of the flange section of the present invention in a fourth preferred embodiment.

A fourth preferred embodiment is shown in FIG. 5. In this embodiment, flexible joint 210 incorporates the nipple 130, first flange piece 144 and second flange piece 146 of the second embodiment of FIG. 3, with section 144 welded to nipple 130 at juncture 141. The remaining design of joint 210 also corresponds to joint 10.

Having described the invention in connection with certain specific preferred embodiments thereof, persons skilled in the art will recognize that modifications may be made in form and detail without departing from the spirit and scope of the present invention.

What is claimed is:

1. In a flexible joint for pipelines where an annular housing has a nipple partially submerged therein with said nipple having a flared end on the submerged portion, control of sound and vibration transmission along the pipeline being a critical characteristic, the combination which comprises:
    (a) an elastomer ring adhered to the inner surface of said flared end and internally contoured spherically with respect to a common center point spaced from said flared end and located on the longitudinal axis of said joint;
    (b) an elastomeric body having an assembly of concentric spherical rings embedded therein, with said elastomeric body adhered to the outer surface of said flared end and with said spherical rings contoured and positioned symmetrically to said common center point;
    (c) a collar encircling said nipple and engaging the outer surface of said elastomeric body to maintain said elastomeric body in position, said collar being weldably mounted to said housing to reduce the level of sound and vibration transmission through the flexible joint as compared to a flexible joint where the collar is bolted to said housing; and
    (d) a support structure within said housing having an outward facing spherical surface mating in sliding relation with the internal surface of said elastomeric ring.

2. The combination set forth in claim 1 wherein the inner and outer surfaces of said flared end are concentrically spherical relative to said center point.

3. The combination set forth in claim 1 wherein said support structure is integral with said housing.

4. In a flexible joint for pipelines where an annular housing with a central cavity has a nipple partially submerged therein with said nipple having a flared end of the submerged portion, control of sound and vibration transmission along the pipe line being a critical characteristic, the combination which comprises:
    (a) an elastomeric ring adhered to the inner surface of said flared end and internally contoured spherically with respect to a common center point spaced from said flared end and located on the longitudinal axis of said joint;
    (b) an elastomeric body having an assembly of concentric spherical rings embedded therein, with said elastomeric body adhered to the outer surface of said flared end and with said spherical rings contoured and positioned symmetrically to said common center point;
    (c) a collar encircling said nipple and adhered to the outer surface of said elastomeric body to maintain said elastomeric body in position, said collar being weldably mounted to said housing to better control the propagation of sound and vibration through the flexible joint; and
    (d) a support structure in said housing having an outward facing spherical surface mating in sliding relation with the internal surface of said elastomeric ring.

5. In a flexible joint for pipe lines where an annular housing has a nipple partially submerged therein with said nipple having a flared end on the submerged portion, control of sound and vibration transmission in the pipe line being a critical characteristic, the combination which comprises:
(a) an elastomeric ring adhered to the inner surface of said flared end and internally contoured spherically with respect to a common center point spaced from said flared end and located on the longitudinal axis of said joint;
(b) an elastomeric body having an assembly of concentric spherical rings embedded therein, with said elastomeric body adhered to the outer surface of said flared end with said spherical rings contoured and positioned symmetrically to said common center point;
(c) a collar encircling said nipple and engaging the outer surface of said elastomeric body to maintain said elastomeric body in position, said collar being mounted to said housing;
(d) a support structure having an outward facing spherical surface mating insliding relation with the internal surface of said elastomeric ring; and
(e) a flange welded to said nipple at the end of the said nipple opposite said flared end to better control the propagation of sound and vibration in the flexible joint as compared to not securing the flange to the nipple.

6. The flexible joint of claim 5 wherein the flange if formed of a first flange section and a second flange section, said first flange section welded to said nipple and said second flange section being slip fit to the first flange section.

7. In a flexible joint for pipe lines where an annular housing has a nipple partially submerged therein with said nipple having a flared end on the submerged portion, control of sound and vibration transmission in the pipeline being a critical characteristic, the combination which comprises:
(a) an elastomeric ring adhered to the inner surfce of said flared end and internally contoured spherically with respect to a common center point spaced from said flared end and located on the longitudinal axis of said joint;
(b) an elastomeric body having an assembly of concentric spherical rings embedded therein, with said elastomeric body adhered to the outer surface of said flared end and with said spherical rings contoured and positioned symmetrically to said common center point;
(c) a collar encircling said nipple and engaging the outer surface of said elastomeric body to maintain said elastomeric body in position, said collar being weldably mounted to said housing to better control the transmission of sound and vibration in the flexible joint compared to bolting the collar to the housing;
(d) a support structure having an outward facing spherical surface mating in sliding relation with the internal surface of said elastomeric ring;
(e) a first flange section, said first flange section being welded to said nipple at the end of said nipple opposite said flared end; and
(e) a second flanged section slip fit to said first flange section and capable of being fixedly secured to the pipeline.

* * * * *